United States Patent
Burton

(10) Patent No.: US 7,647,843 B2
(45) Date of Patent: *Jan. 19, 2010

(54) UNIVERSAL SENSOR CONTROLLER FOR A THERMAL ANEMOMETER

(75) Inventor: Bruce B. Burton, Royal Oaks, CA (US)

(73) Assignee: Los Robles Advertising, Inc., Monterey, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/173,233

(22) Filed: Jul. 15, 2008

(65) Prior Publication Data

US 2008/0271545 A1  Nov. 6, 2008

Related U.S. Application Data

(62) Division of application No. 11/857,353, filed on Sep. 18, 2007, now Pat. No. 7,418,878.

(60) Provisional application No. 60/845,665, filed on Sep. 19, 2006.

(51) Int. Cl.
*G01F 1/46* (2006.01)
(52) U.S. Cl. .................................. 73/861.85
(58) Field of Classification Search .............. 73/861.85, 73/204.14, 204.19, 204.15
See application file for complete search history.

(56) References Cited

U.S. PATENT DOCUMENTS

| | | | |
|---|---|---|---|
| 2,726,546 A | 12/1955 | King, Jr. | |
| 4,537,068 A | 8/1985 | Wrobel et al. | |
| 4,672,847 A | 6/1987 | Uchiyama et al. | |
| 4,860,583 A | 8/1989 | Olson | |
| 4,982,605 A | 1/1991 | Oram et al. | |
| 5,064,296 A | 11/1991 | Huijsing et al. | |
| 5,291,142 A * | 3/1994 | Ohmi | 324/719 |
| 5,493,906 A | 2/1996 | Sen-Zhi | |
| 5,654,507 A | 8/1997 | Hicks et al. | |
| 6,450,024 B1 * | 9/2002 | McCulloch et al. | 73/204.25 |
| 6,564,652 B1 | 5/2003 | Zoccola, Jr. | |
| 6,705,158 B1 | 3/2004 | Louden | |
| 7,418,878 B2 * | 9/2008 | Burton | 73/861.85 |
| 2008/0259651 A1 * | 10/2008 | Huynh et al. | 363/21.12 |

* cited by examiner

*Primary Examiner*—Jewel Thompson
(74) *Attorney, Agent, or Firm*—Patent Law Group LLP; David C. Hsia

(57) ABSTRACT

A flow switch uses an analog-to-digital converter combined with a multiplexer to measure voltages at one or more points of a measurement circuit and an algorithm within a microcontroller to calculate flow velocity. The measurement circuit has at least one sensor in the fluid stream. The sensor is heated by passing an electric current through the sensor. A second optional upstream sensor is not heated and is at the fluid temperature. The microcontroller then uses the voltage measurements with calibration information and equations based on the desired mode of operation to calculate the flow velocity.

8 Claims, 6 Drawing Sheets

UNIVERSAL SENSOR CONTROLLER FOR A THERMAL ANEMOMETER

CROSS REFERENCE TO RELATED APPLICATIONS

This application is a divisional of U.S. application Ser. No. 11/857,353, filed on Sep. 18, 2007, now U.S. Pat. No. 7,418,878, which claims priority to U.S. Provisional App. Ser. No. 60/845,665 filed on Sep. 19, 2006.

FIELD OF INVENTION

This invention relates to systems and methods for measuring fluid properties such as fluid velocity, volumetric flow, and mass flow rate.

DESCRIPTION OF RELATED ART

The thermal anemometer or "hot wire anemometer" has been around since the 1800's. Both liquid and gas velocities are measured with this instrument with the most success being with gases. There are several general sensor and circuit configurations that are used in this type of gas velocity measurement systems.

FIG. 1 is a block diagram of a conventional constant power anemometer (CPA) in which the sensor or an adjacent heater is supplied with a fixed amount of power so that it has a temperature above the fluid temperature. The device then measures the temperature difference between this heated sensor and a second upstream sensor measuring the fluid temperature. This temperature difference is calibrated against fluid flow velocity. This device is also know as a thermal dispersion flow meter and is the most popular product on the market today due to its low cost of implementation. This architecture finds most of its applications as a flow switch.

FIG. 2 is a block diagram of a conventional constant temperature anemometer (CTA) or a proportional temperature difference anemometer (PTDA). In the case of a CTA, a single self-heated sensor 202 is operated at a fixed temperature above the fluid temperature. In a typical application, sensor 202 is at a temperature far above the fluid temperature and the response is generally independent of small changes in fluid temperature. For the circuit shown in FIG. 2, resistor 203 is a fixed resistor and the bridge circuit holds the resistance and therefore the temperature of sensor 202 constant. The required power input to self-heated sensor 202 to maintain the fixed temperature varies with the fluid stream velocity and temperature. Maintaining a constant sensor temperature is done by a circuit design that varies the current or power dissipation through sensor 202. The value of the current or power dissipation is calibrated versus fluid flow velocity. This is the oldest method and it is also known as the hot wire anemometer (e.g., see U.S. Pat. No. 5,654,507).

A typical circuit design used in CTA devices is known as a "Wheatstone Bridge." This circuit varies the current through sensor 202 to obtain a null or zero value between the sides of the bridge effectively maintaining the resistance of sensor 202 at a constant value and sensor 202 at a constant temperature. The design of circuit 200 drives the input to an amplifier 201 to zero (balanced) by increasing or decreasing current through sensor 202 to change its temperature and resistance until the bridge is balanced. The resistors in the circuit are typically selected so that the main power dissipation and heating is through sensor 202 and resistor 203 is a fixed resistor outside the fluid flow. This architecture is still used today where very high speed measurements are used in aerodynamic research.

A conventional proportional temperature difference anemometer (PTDA) is similar in configuration as the CTA device and also typically uses a Wheatstone Bridge type circuit as shown in FIG. 2. In the case of a PTDA, resistor 203 is a sensor that is temperature dependent and is in the fluid flow. However, the PTDA is operated in a different mode. As the fluid temperature goes up and down, the temperature difference between self-heated sensor 202 and the fluid temperature increases or decreases with the fluid temperature depending on the sensor mode (temperature difference function). PTDA architecture is generally considered to provide measurements with the highest precision especially over a range of fluid temperatures. U.S. Pat. Nos. 2,726,546 and 4,982,605 are dual thermistor sensor versions of the PTDA. U.S. Pat. No. 4,537,068 uses a diode for fluid temperature and a thermistor for the self heated sensor.

Each of these designs has different advantages and disadvantages in various applications. For large changes in flow velocity or for different fluids types, the power required for the CPA type device would vary widely for optimal performance. Typical devices have jumper selected or microprocessor selected resistors to adjust the power and optimize the temperature difference between the sensor temperature and the fluid temperature but in all cases use an analog circuit that is designed to control the current through the heated sensor. All of these devices require precision analogue components to obtain accurate results since the circuits have to be trimmed or balanced. Calibration usually requires that the electronic circuit and sensors be calibrated together since the resistance and thermal response of the sensor and the circuit components affect the calibration curve of the device. Also, depending on the desired mode of operation (CPA, CTA, or PTDA), the circuit design and even the sensor configuration are different so that switching to a different mode of operation could required a different meter configuration and a different circuit design or circuit components.

BRIEF DESCRIPTION OF THE DRAWINGS

Use of the same reference numbers in different figures indicates similar or identical elements.

SUMMARY

Embodiments of the invention provide a flow switch. The flow switch uses an analog-to-digital converter combined with a multiplexer to measure voltages at one or more points of a measurement circuit, and an algorithm within a microcontroller to adjust voltages or currents within the circuit and then to calculate the flow velocity. The measurement circuit has at least one sensor in the fluid stream. A second optional upstream sensor is not heated and is at the fluid temperature. The microcontroller then uses the voltage measurements with calibration information and equations based on the desired mode of operation to calculate the flow velocity.

DETAILED DESCRIPTION

Figure 3:
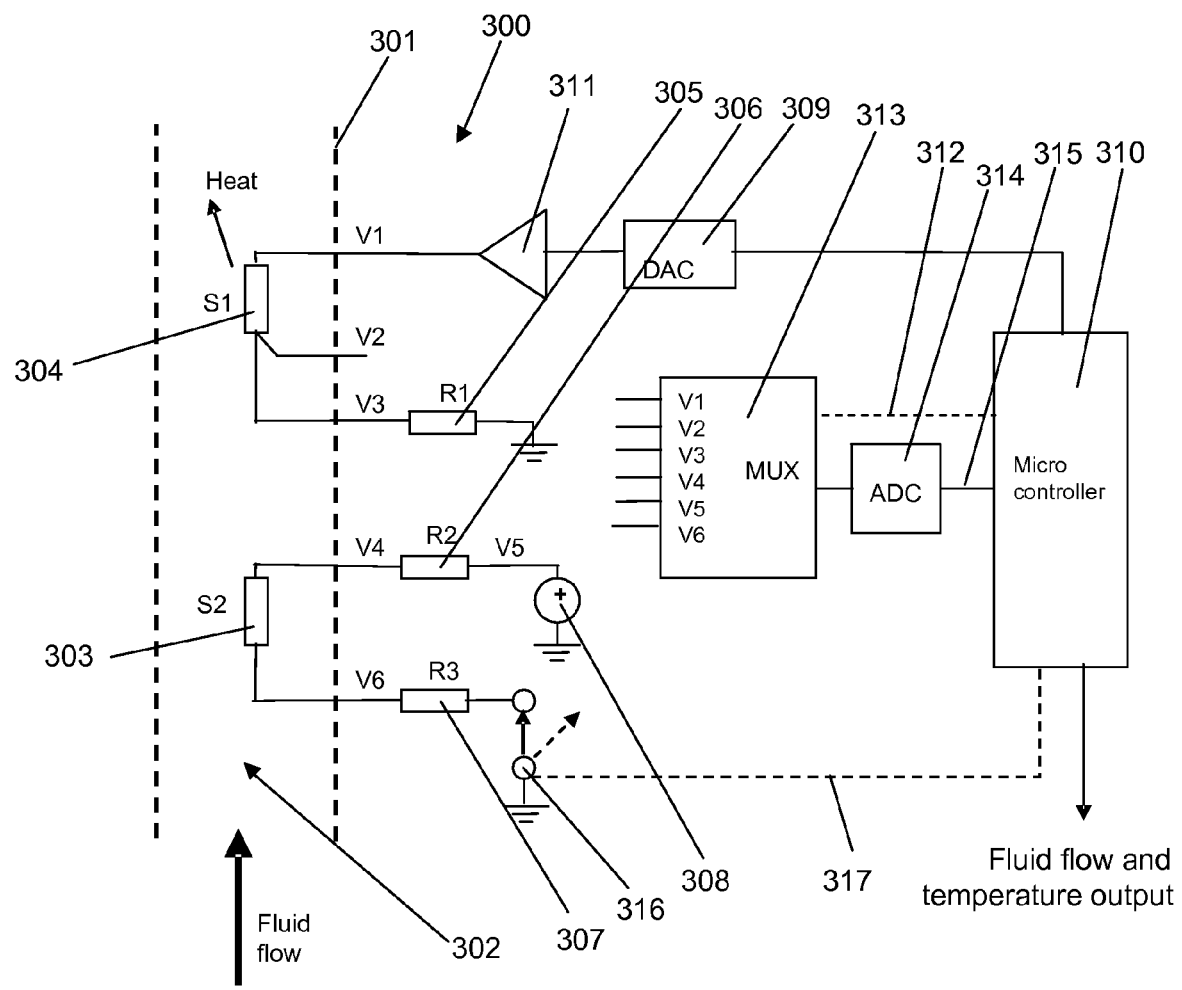
FIG. 3 is a block diagram of a system that can be configured (in firmware/software) as different types of anemometers in one embodiment of the invention.

FIG. 3 is a diagram of a fluid property measurement system 300 in embodiments of the invention. System 300 can be configured as a constant temperature anemometer (CTA), a proportional temperature difference anemometer (PTDA), or a constant power anemometer (CPA) to measure flow velocity, volumetric flow, and mass flow rate.

System 300 includes a fluid passage 301 that conducts a fluid 302 over a non-heated sensor 303(S2) and then a heated sensor 304(S1). Sensors 303 and 304 have an electrical characteristic that varies with temperature, which in turn varies with the fluid property to be measured. In one embodiment, sensors 303 and 304 are resistive elements that change resistance as their temperature changes. For example, sensors 303 and 304 are resistance temperature detectors (RTDs) that have a platinum wire wound around a ceramic form.

Non-heated sensor 303 is generally operated with a low current flow or low power dissipation so that the temperature of sensor 303 is at the fluid temperature. Heated sensor 304 is operated with a higher current flow or higher power dissipation so that the temperature of sensor 304 is above the fluid temperature and loses heat to fluid 302 depending on the difference in temperature between sensor 304 and fluid 302 and the flow velocity of fluid 302.

A microcontroller 310 provides a control signal to a digital-to-analog converter (DAC) 309. DAC 309 takes the control signal and provides an input voltage to a buffer amplifier 311. Amplifier 311 provides an input voltage to the input terminal of sensor 304. The output terminal of sensor 304 is coupled to the input terminal of a current sensing resistor 305. In one embodiment, sensor 304 is in a three-wire configuration so it has a potential lead that facilitates lead wire resistance correction. The output terminal of resistor 305 is coupled to ground. Thus, amplifier 311 provides a first current that flows through a first serial path including sensor 304 and resistor 305.

A voltage source 308 provides a constant reference voltage to the input terminal of a current sensing resistor 306. The output terminal of resistor 306 is coupled to the input terminal of sensor 303. The output terminal of sensor 303 is coupled to the input terminal of a current limiting resistor 307. The output terminal of resistor 307 is coupled by a switch 316 to ground. Thus, voltage source 308 provides a second current that flows through a second serial path including resistor 306, sensor 303, and resistor 307.

Resistors 305, 306, and 307 have well known resistances such that the voltage drop across each resistor can be used to accurately calculate the current flow through the resistor. In general, resistors 305, 306 and 307 are selected to have very low temperature dependence and are sized to have low self heating so that a current flow will not cause a change in resistance of these resistors.

Microcontroller 310 outputs a control signal 312 to cause a multiplexer 313 to direct one of voltages V1 through V6 along the two serial paths described above to an analog-to-digital converter (ADC) 314. Alternatively, multiplexer 313 cycles through voltages V1 through V6. Although not shown for simplicity, there are signal connections from the input terminals of multiplexer 313 to the voltage measurement points in the two serial paths. Specifically, voltage V1 is measured at the output terminal of amplifier 311/the input terminal of sensor 304, voltage V2 is measured at the potential lead of sensor 304, voltage V3 is measured at the output terminal of sensor 304/the input terminal of resistor 305, voltage V4 is measured at the output terminal of resistor 306/the input terminal of sensor 303, voltage V5 is measured at the input terminal of resistor 306, and voltage V6 is measured at the output terminal of sensor 303/the input terminal of resistor 307. ADC 314 digitizes the selected voltage and passes the digital value to microcontroller 310. Microcontroller 310 adjusts the digital input to DAC 309 to adjust the current through heated sensor 304 according to a predetermined objective of current, power, or temperature as will be discussed further below. Microcontroller 310 then processes the various measured values to calculate various fluid properties and outputs the resulting calculated values to a meter, display, data storage device, or other component for further use. The output from microcontroller 310 can take the form of a digital signal (e.g., RS-485 Modbus) or an analog signal such as a voltage or current (e.g., 4 to 20 mA). Depending on the embodiment, DAC 309, microcontroller 310, amplifier 311, multiplexer 313, and ADC 314 may be discrete components or part of an integrated circuit. It should be noted that the process described above occurs in a repeated cyclic mode such as every 20 ms (milliseconds) so that the current flowing through sensor 304 is varied as needed to meet the predetermined objective. The cycle time can be varied over a wide range.

Measurement resolution sufficient to obtain a useful signal-to-noise ratio in a system 300 using RTD sensors 303 and 304 requires about 18 bits of ADC data. Some of the signals like voltage V3 across a small current sensing resistor 305 need to be amplified before digitizing to maintain the resolution, whereas some signals like voltage V1 need to be attenuated before digitizing. These amplifiers or attenuators can be incorporated as additional discrete components at the point of the measurement in the circuit. Alternatively, they can be incorporated into multiplexer 313 or upstream of ADC 314 and the amplification or attenuation (gain) is controlled by microcontroller 310. Microcontroller 310 contains firmware or software instructions that control the actions, measurements, and calculations described herein. This firmware can take many different forms well known in the art.

Constant Temperature Anemometer

To operate system 300 as a CTA, microcontroller 310 holds heated sensor 304 at a constant temperature by adjusting the current supplied by amplifier 311 to maintain the temperature of sensor 304 at the selected constant temperature. This would be done by maintaining sensor 304(S1) at a constant resistance. Microcontroller 310 then correlates the current to the flow property (e.g., flow velocity) of fluid 302.

Specifically, microcontroller 310 first measures voltage V3 by directing multiplexer 313 to pass voltage V3 through ADC 314 to the microcontroller. Microcontroller 310 then determines the current flowing through resistor 305 from the known resistance of resistor 305 and the voltage drop across resistor 305 as follows:

$$I_{S1} = V3/R1, \qquad (1.0)$$

where $I_{S1}$ is the current through resistor 305 and R1 is the known resistance of resistor 305 stored in memory. Note that current $I_{S1}$ through resistor 305 is also the current through sensor 304 since they are in the same serial path.

In FIG. 3, a line connecting the output of sensor 304 but carrying no current is connected to voltage point V2 to allow the measurements to be corrected for lead wire resistance. Since the line to V3 carries the current just calculated with equation 1.0 above, and V2-V3 gives the voltage drop across lead wire connected to voltage point V3, the lead wire resistance $R_{LW}$ for one lead wire is given by:

$$R_{LW} = \frac{R1(V2-V3)}{V3}. \quad (1.1)$$

Microcontroller 310 next measures voltages V1 and V2 by directing multiplexer 313 to pass voltages V1 and V2 through ADC 314 to the microcontroller. The resistance of the sensor 304(S1) is the total resistance of the path including the two lead wires minus the resistance of the two lead wires. Microcontroller 310 then determines the resistance of sensor 304 from the current through sensor 304 and the voltage drop across sensor 304 using the following formula:

$$R_{S1} = \frac{R1(V1-V3)}{V3} - \frac{2R1(V2-V3)}{V3} = \frac{R1(V1+V3-2V2)}{V3}, \quad (2.0)$$

where $R_{S1}$ is the resistance of sensor 304. Equation 2.0 includes the term $$\frac{2R1(V2-V3)}{V3}$$

for compensating the resistance of the two lead wires. This signal wire resistance can be assumed to be the same for all signal wires when all the wires are the same length and same gage. It should be noted that lead wire resistance measurement V2 can be eliminated if this correction is not needed. In this case, equation 2.0 is simplified by making V2 equal to V3 thus eliminating the lead wire resistance compensation term.

Microcontroller 310 next determines the temperature of sensor 304(S1) from the resistance of sensor 304. To do this, microcontroller 310 uses the resistance versus temperature curve (e.g., a lookup table) of sensor 304 stored in memory. Instead of storing an actual curve, microcontroller 310 can store in memory a function that represents the curve. In one embodiment using a platinum RTD sensor 304, the relationship between resistance and temperature is defined by the following second order function of temperature:

$$R_{S1} = R0_{S1} + R0_{S1} \cdot \alpha \cdot T_{S1} - R0_{S1} \cdot \beta \cdot T_{S1}^2 \quad (3.0)$$

where $R0_{S1}$ is the resistance of sensor 304 at 0° C., $\alpha$ is a constant equal to 0.003908/° C., $\beta$ is a constant equal to $5.8 \times 10^{-7}/°$ C.$^2$, and $T_{S1}$ is the temperature of sensor 304. $R0_{S1}$, $\alpha$, and $\beta$ are constants stored in memory of microcontroller 310. Solving this equation for the temperature of sensor 304 gives the following equation:

$$T_{S1} = \frac{-(-R0_{S1} \cdot \alpha) - \sqrt{(-R0_{S1} \cdot \alpha)^2 - 4(R0_{S1} \cdot \beta)(R_{S1} - R0_{S1})}}{2(R0_{S1} \cdot \beta)}. \quad (4.0)$$

Microcontroller 310 then adjusts the current through sensor 304 to hold the temperature of sensor 304 at a fixed value. For example, microcontroller 310 increases the voltage supplied by amplifier 311 to sensor 304 when the temperature is less than the fixed value, and vice versa. Instead of holding the temperature constant, microcontroller 310 can also hold the resistance of sensor 304 at a fixed value since the temperature and the resistance of sensor 304 are proportional.

While microcontroller 310 holds the temperature of sensor 304 constant, it determines the flow velocity from the current through sensor 304. To do so, microcontroller 310 uses the current versus flow velocity curve (e.g., a lookup table) of sensor 304 stored in memory. Instead of storing an actual curve, microcontroller 310 can store in memory a function that represents the curve.

The process described above occurs in a cyclic manner at some periodic rate. For example, every 20 ms the voltages are measured and the calculations done by the microcontroller and then the signal to DAC 309 adjusted as needed. This process is continually repeated thus maintaining the temperature or power through sensor 304 as required. The cycle time can be varied over a wide range depending on response time of the sensor or other circuit components or the speed at which the fluid properties may vary. Cycle time can vary from 0.1 ms to minutes. A cycle time of 1 ms to 1 second is preferred and a cycle time of 5 ms to 100 ms is most preferred.

Proportional Temperature Difference Anemometer

To operate system 300 as a PTDA, microcontroller 310 holds the temperature difference between sensors 303 and 304 constant by adjusting the current supplied by amplifier 311 and then correlates the current to the flow property (e.g., flow velocity) of fluid 302.

Specifically, microcontroller 310 measures voltage V3 and then determines the current through sensor 304(S1) as described above with the CTA mode. Microcontroller 310 then measures voltages V1, V2, and V3 and calculates the temperature of sensor 304 as described above with the CTA mode. Microcontroller 310 next measures voltages V4, V5, and V6 and calculates the temperature of sensor 303. Specifically, microcontroller 310 directs multiplexer 313 to pass voltages V4, V5, and V6 through ADC 314 to the microcontroller. Microcontroller 310 then determines the current through resistor 306 from the known resistance of resistor 306 and the voltage drop across resistor 306 as follows:

$$I_{S2} = (V5-V4)/R2, \quad (4.1)$$

where $I_{S2}$ is the current through resistor 306 and R2 is the known resistance of resistor 306 stored in memory. Alternatively, the known resistance of resistor 307 and the voltage drop across resistor 307 can also be used to determine current $I_{S2}$. Note that current $I_{S2}$ through resistor 306 and 307 is also the current through sensor 303(S2) since they are in the same serial path.

Microcontroller 310 next determines the resistance of sensor 303(S2) from the current through sensor 303 and the voltage drop across sensor 303 as shown in equation 5.0 again subtracting the resistance of the 2 lead wires as calculated above.

$$R_{S2} = \frac{R2(V4-V6)}{V5-V4} - \frac{2R1(V2-V3)}{V3} \quad (5.0)$$

where $R_{S2}$ is the resistance of sensor 303. Equation 5.0 includes the term $$\frac{2R1(V2-V3)}{V3}$$

for compensating for the resistance of the two lead wires.

Microcontroller 310 then determines the temperature of sensor 303 from the resistance of sensor 303(S2). To do so, microcontroller 310 uses the resistance versus temperature curve (e.g., a lookup table) of sensor 303 stored in memory. Instead of storing an actual curve, microcontroller 310 can store in memory a function that represents the curve. In one embodiment using a platinum RTD sensor 303, the relationship between resistance and temperature is defined by the following function:

$$T_{S2} = \frac{-(-R0_{S2}\cdot\alpha) - \sqrt{(-R0_{S2}\cdot\alpha)^2 - 4(R0_{S2}\cdot\beta)(R_{S2} - R0_{S2})}}{2(R0_{S2}\cdot\beta)}, \quad (6.0)$$

where $T_{S2}$ is the temperature of sensor 303, $R0_{S2}$ is the resistance of sensor 303 at 0° C. stored in memory, and $\alpha$ and $\beta$ are constants for the sensor 303 stored in memory and can be different from the constants for sensor 304. The temperature of sensor 303 is assumed to be substantially equal to the fluid temperature since it is not self-heated.

Microcontroller 310 then maintains sensor 304 at the required temperature above the temperature of sensor 303 by adjusting the current through sensor 304. For example, microcontroller 310 increases the voltage supplied by amplifier 311 to sensor 304 when the temperature difference is less than the required value, and vice versa.

While microcontroller 310 holds the temperature difference between sensors 303 and 304 constant, it determines the flow velocity from the current through sensor 304. To do so, microcontroller 310 uses the current versus flow velocity curve (e.g., a lookup table) of sensor 304 stored in memory. Instead of storing an actual curve, microcontroller 310 can store in memory a function that represents the curve. Correction of the fluid property for temperature can be done by using series of curves relating the fluid property to current at series of temperatures covering the temperature range of interest. Microcontroller 310 can also use interpolation algorithms to interpolate between the temperatures of the curves to more accurately estimate the fluid property at the given fluid temperature. Alternatively, the data relating the fluid property to current can be in the form of a multidimensional lookup table. Another option is to use an analytical model to relate the fluid property at one temperature to the fluid property at another temperature based on physical properties of the fluid. This model in the form of an analytical expression can then be used with a single calibration curve relating fluid property to current at one standard temperature to the fluid property at any other temperature.

Instead of converting the resistances into temperatures, microcontroller 310 can simulate a Wheatstone Bridge by computing a target resistance of sensor 304 as follows:

$$R_{S1\;target} = \frac{Rb}{Rx}(Ry + R_{S2}), \quad (7.0)$$

where $R_{S1target}$ is the target resistance of sensor 304, $R_{S2}$ is the resistance of sensor 303 determined from equation 5.0 as described above, and Rx, Ry, and Rb are resistances of simulated balancing resistors of the Wheatstone Bridge. In one embodiment, Rb is equal to 2.5072 ohms, Rx is equal to 75.1100 ohms, and Ry is equal to 33.7700 ohms.

Microcontroller 310 then adjusts the voltage provided by amplifier 311 so that the resistance $R_{S1}$ of sensor 304 determined from equation 2.0 as described above is equal to target resistance $R_{S1target}$. In one embodiment, microcontroller 310 uses a proportional-integral-differential (PID) control loop to adjust the resistance of sensor 304 until it is equal to the target resistance of sensor 304 as follows:

$$\text{Vout}(x) = P_{gain} * x + I_{gain} * \text{Sum}[x + x\text{total}], \quad (8.0)$$

where Vout(x) is the voltage provided by amplifier 311, x is the error equal to $R_{S1target} - R_{S1}$, $P_{gain}$ is the proportional gain, $I_{gain}$ is the integral gain, and $x_{total}$ is the integrated error. As described above, the measurement and adjustment of temperature of sensor 304 is done in a cyclic manner with the cycle time varying over a wide range depending on the system characteristics and the performance required as described above.

Figure 6:
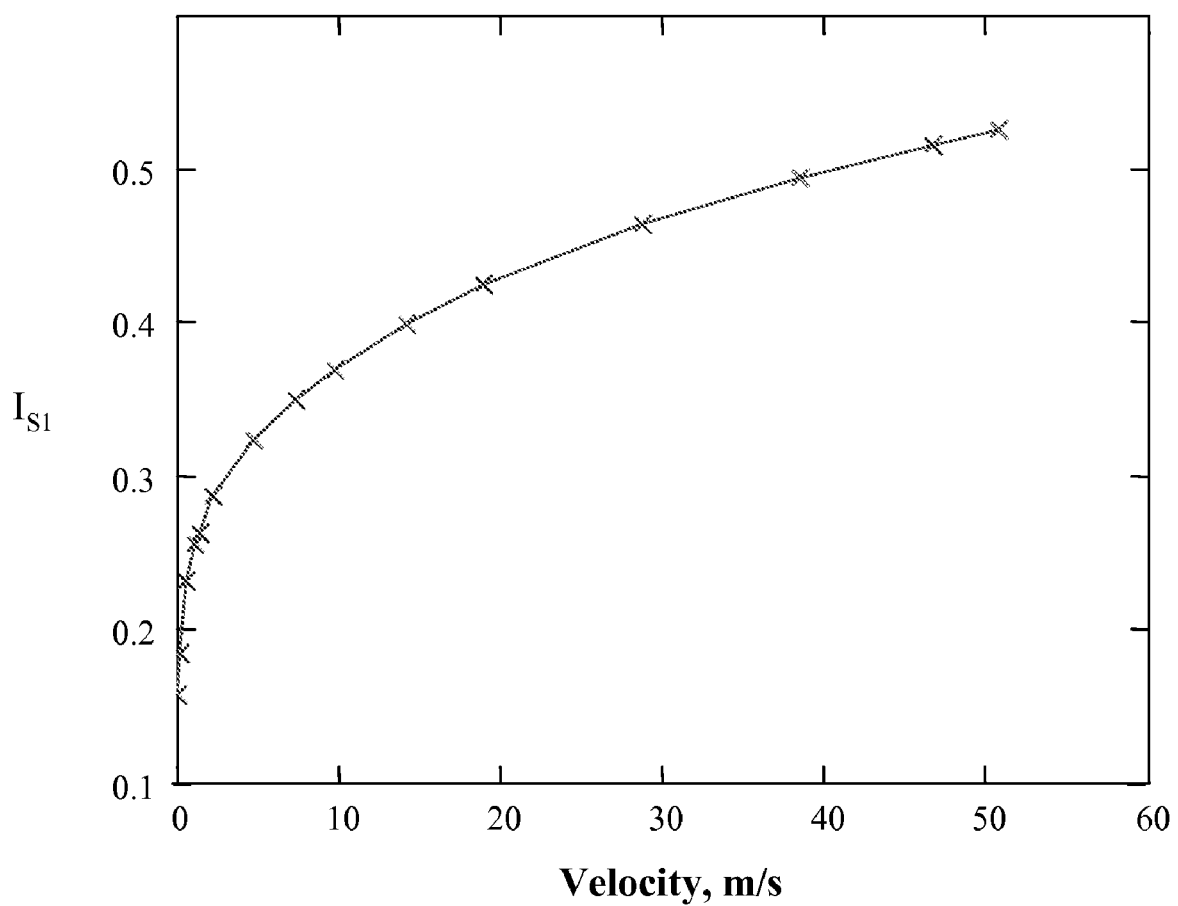
FIG. 6 is a graph of velocity determined from the system of FIG. 3 in one embodiment of the invention.

Table 1 shows exemplary data of current versus velocity resulting from the simulated Wheatstone Bridge anemometer in one embodiment of the invention where the standard velocity is velocity at conditions of 0° C. and 1 atmosphere pressure. Air velocity is in standard meters per second and current is in DC amps. Table 1 is also plotted in FIG. 6

TABLE 1

| Flow (standard m/s) | Current (DC amps) |
|---|---|
| 50.7257 | 0.525 |
| 46.7362 | 0.516 |
| 38.4318 | 0.4946 |
| 28.737 | 0.4637 |
| 18.9111 | 0.4242 |
| 14.2782 | 0.3986 |
| 9.7835 | 0.369 |
| 7.3411 | 0.3495 |
| 4.7759 | 0.3238 |
| 2.2832 | 0.2867 |
| 1.4472 | 0.2628 |
| 1.1881 | 0.2559 |
| 0.6702 | 0.2308 |
| 0.1693 | 0.1848 |
| 0 | 0.1578 |

Constant Power Anemometer

To operate system 300 as a CPA, microcontroller 310 directs DAC 309 to maintain a constant power (voltage drop times current) through sensor 304 and then correlates the temperature difference between sensors 303 and 304 to the flow property (e.g., flow velocity) of fluid 302. Specifically, microcontroller 310 measures voltages V1 and V3 and then determines the voltage drop across sensor 304 (i.e., V1-V3) and the current through sensor 304 as described above. For lead wire resistance correction, microcontroller 310 also measures voltage V2. Microcontroller 310 then determines the power through sensor 304 as follows:

$$P_{S1} = (V1 + V3 - 2V2)V3/R1, \quad (9.0)$$

where $P_{S1}$ is the power of sensor 304. Equation 9.0 includes compensation for two lead wires. Microcontroller 310 next adjusts the current through sensor 304 to maintain power $P_{S1}$ at a constant value. For example, microcontroller 310 increases the voltage supplied by amplifier 311 to sensor 304 when the power is less than the required value, and vice versa.

While microcontroller 310 maintains a constant power to sensor 304, it determines the flow velocity from the temperature difference between sensors 303 and 304. Specifically, microcontroller 310 calculates the temperature of sensor 304 from voltages V1, V2, and V3 as described above. Microcontroller 310 then measures voltages V4, V5, and V6 and calculates the temperature of sensor 303 as described above. Microcontroller 310 next determines the flow velocity from the temperature difference between sensors 303 and 304. To do so, microcontroller 310 uses the temperature difference versus flow velocity curve (e.g., a lookup table) of sensors 303 and 304 stored in memory. Instead of storing an actual curve, microcontroller 310 can store in memory a function that represents the curve.

Control Strategies for Anemometers

Figure 4:
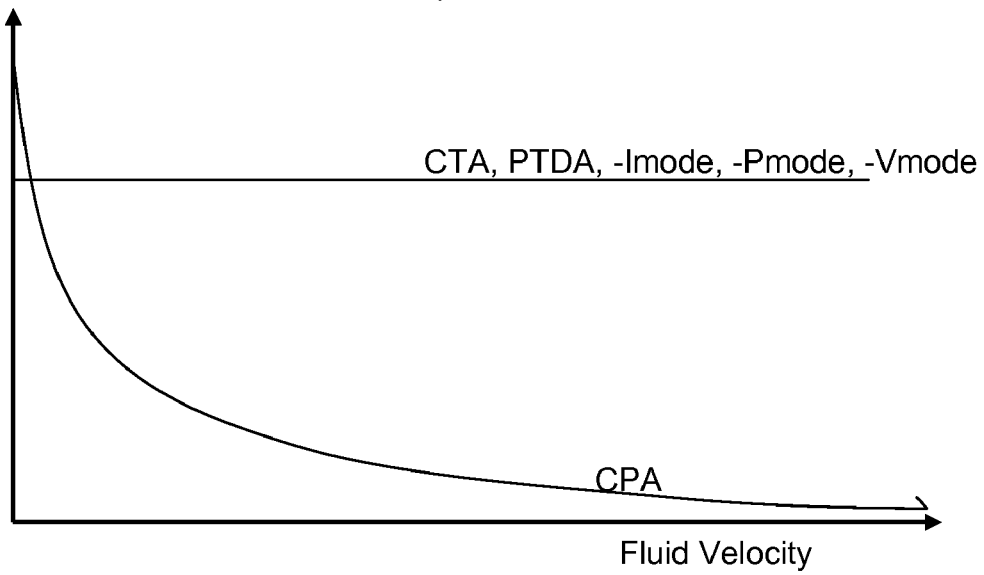
FIGS. 4 and 5 are graphs illustrating the control strategies of different anemometers in embodiments of the invention.

FIG. 4 illustrates the general characteristics for the various anemometer designs at a constant fluid temperature. As shown, the temperature difference between the heated sensor and the fluid temperature for a CPA anemometer decreases as the fluid velocity increases. This is because at higher fluid velocity, the heat losses from the heated sensor increase and the sensor temperature approaches the fluid temperature. The curve for the CPA anemometer is essentially the velocity calibration curve relating fluid velocity to the difference between the heated sensor temperature and the fluid temperature. At higher fluid velocities, the power dissipation in the heated sensor must increase to maintain a reasonably large temperature difference between the heated sensor and good measurement accuracy.

FIG. 4 shows that CTA and PTDA anemometers maintain a constant temperature difference between the heated sensor and the fluid temperature. The power required to maintain this temperature difference increases as fluid velocity increases and allows calculation of the fluid velocity using a calibration curve that relates current or power to the fluid velocity. While the accuracy of the CPA anemometer would decrease as fluid velocity increases, the accuracy of the CTA and PTDA type anemometers would remain essentially constant as fluid velocity increases.

Figure 5:
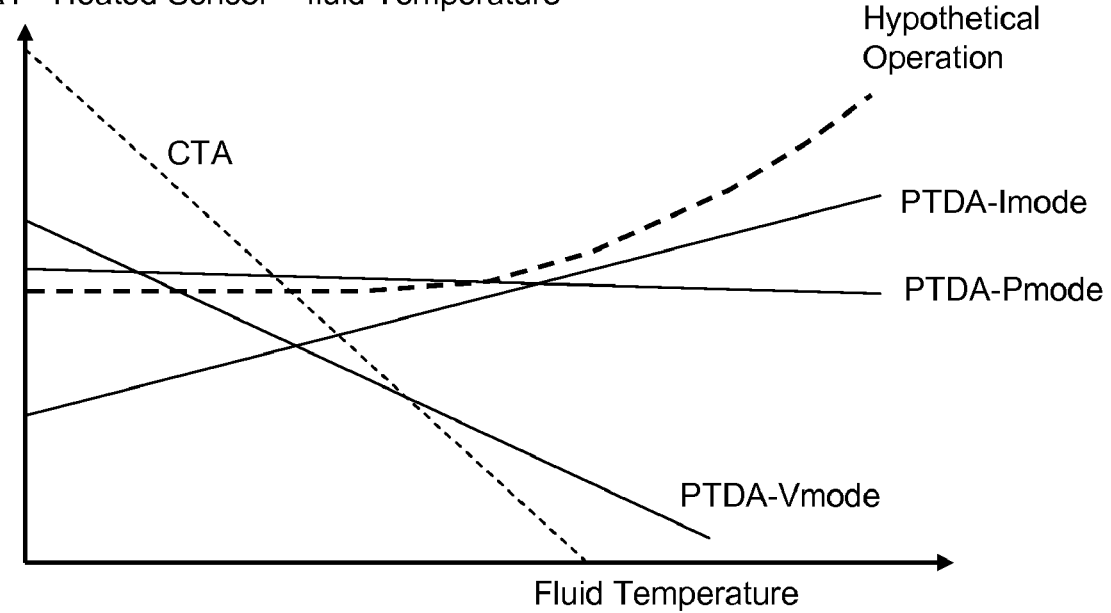

FIG. 5 shows how the temperature difference between the heated sensor and the fluid temperature varies for different anemometer types with changes in fluid temperature and at a constant fluid velocity. The CPA anemometer is not shown since it would have a band of curves across the graph, following a different line for each fluid velocity. The CTA anemometer shows a linear decrease in temperature difference as the fluid temperature increases because the heated sensor temperature is held at a constant temperature. Clearly, as the fluid temperature rises, the accuracy of this device would decrease. The PTDA anemometers are operated at a constant temperature above the fluid temperature as fluid velocity changes (see FIG. 4). As the fluid temperature changes, the temperature difference can either increase with the fluid temperature (PTDA-Imode), remain relatively constant (PTDA-Pmode), or decrease with the fluid temperature (PTDA-Vmode). These various modes are the result of various analog circuit designs developed over time and for various applications. The PTDA-Vmode was an early design that was easy to implement in analog circuitry but would have decreasing accuracy as the fluid temperature increased. The PTDA-Pmode and PTDA-Imode designs would provide more consistent accuracy as fluid temperature changes.

These types of anemometers have advantages and disadvantages in different applications and one may be preferred over the other depending on the need. While the curves shown in FIGS. 4 and 5 are indicative of various analog circuits used in past designs, system 300 described herein has the capability of following any of these performance characteristics or any envisioned performance with changes in fluid velocity or changes in fluid temperature. For example, a line could be drawn in FIG. 4 with an increase in delta temperature as fluid velocity increases to obtain a higher accuracy at high fluid velocities. Also, in FIG. 5, a line could be drawn with the delta temperature increasing as the fluid temperature increases to obtain potentially higher accuracy as fluid temperature increases. An example of such a fluid temperature dependent temperature difference is shown in FIG. 5 labeled as Hypothetical Operation for the target temperature difference desired. In actual operation, microcontroller 310 would determine the fluid temperature from non-heated sensor 303(S2) and then use the Hypothetical Operation curve on FIG. 5 to determine the target temperature difference and therefore the temperature of heated sensor 304(S1). Microcontroller 310 would then adjust the heating current to sensor 304 to obtain the target temperature. In this manner, any curve on FIG. 4 or 5 or any hypothetical curve on FIG. 4 or 5 can be followed to obtain desirable performance characteristics using this inventive circuit. In another approach, the performance can be changed by operator intervention to increase accuracy depending on user needs. For example, the device can be operated at low power input and therefore low delta temperature as a standby monitoring mode and then delta temperature increased to obtain higher accuracy for a specific measurement when needed.

Modifications and Options

System 300 can be modified in various ways. Sensors 303 and 304 can be of any type that has varying electrical properties with temperature. For example, they can be platinum RTDs. A variety of other metals can form the resistive element such as nickel, copper, or many other metals. The RTD sensors can consist of a metal wire wound around a ceramic or non-conducting core, a metal film plated, coated, or applied in some other manner onto a ceramic or non-conducting form. The sensor elements can also be diodes or thermistors.

In system 300, current sensing resistor 305 is located between sensor 304 and ground. Alternatively, resistor 305 may be placed between amplifier 311 and sensor 304. Similarly, current measuring resistor 306 on the fluid temperature sensor 303 circuit can be placed in the position of current limiting resistor 307 and the current limiting resistor 307 eliminated or placed in the position of resistor 306.

Switch 316 can be opened via signal line 317 and a measurement of voltages V5 and V4 would allow leakage current associated with sensor 303 to be measured. Such leakage current should be very low and a high leakage current could indicate sensor failure. A switch similar to switch 316 could be provided between resistor 305 and ground and a measurement of voltages V1 and V3 would allow measurement of leakage current associated with sensor 304.

Microcontroller 310 can take many forms. It could be a simple microprocessor, a microcomputer, a programmable controller, or other digital devices that can store calibration data and direct the measurements and calculations associated with the measurement described herein.

Microcontroller 310 could be programmed to signal a fault within system 300. For example, microcontroller 310 can monitor any of the voltages, currents, resistances, powers, and leakage currents of the sensors and resistors for values that are out of expected ranges. Once an error is detected, microcontroller 310 can send a warning to the user and shut down system 300 to prevent damage.

When operating in the CPA mode, although the controller should essentially maintain constant power, the microcontroller 310 can be programmed to adjust the target power level up or down depending on the fluid being measured or depending on the fluid temperature or even depending on the fluid velocity range. Changing the power level would also require the use of a different calibration curve relating the temperature difference to fluid property for the each selected power level.

System 300 also allows the use of a single sensor that would act as both the heated sensor and the non-heated sensor. This can be done by cycling the operation of the single sensor between an unheated operation where the sensor would measure the fluid temperature and a heated operation where the sensor would then measure fluid velocity. For example, microcontroller 310 can use sensor 304 for both heated and non-heated operation. When in the non-heated operation, microcontroller 310 causes amplifier 311 to provide a low voltage to sensor 304 to measure the fluid temperature. Alternatively, the microcontroller can direct a switch to be closed to place a current limiting resistor in the circuit of sensor 304 thus limiting current so that sensor 304 is not heated and is at the fluid temperature. Such an approach might be cost effective in applications where the sensors are very expensive, measurement data is only needed periodically, the fluid velocity or temperature does not change rapidly, or sensor heat up and cool down is rapid.

Figure 7:
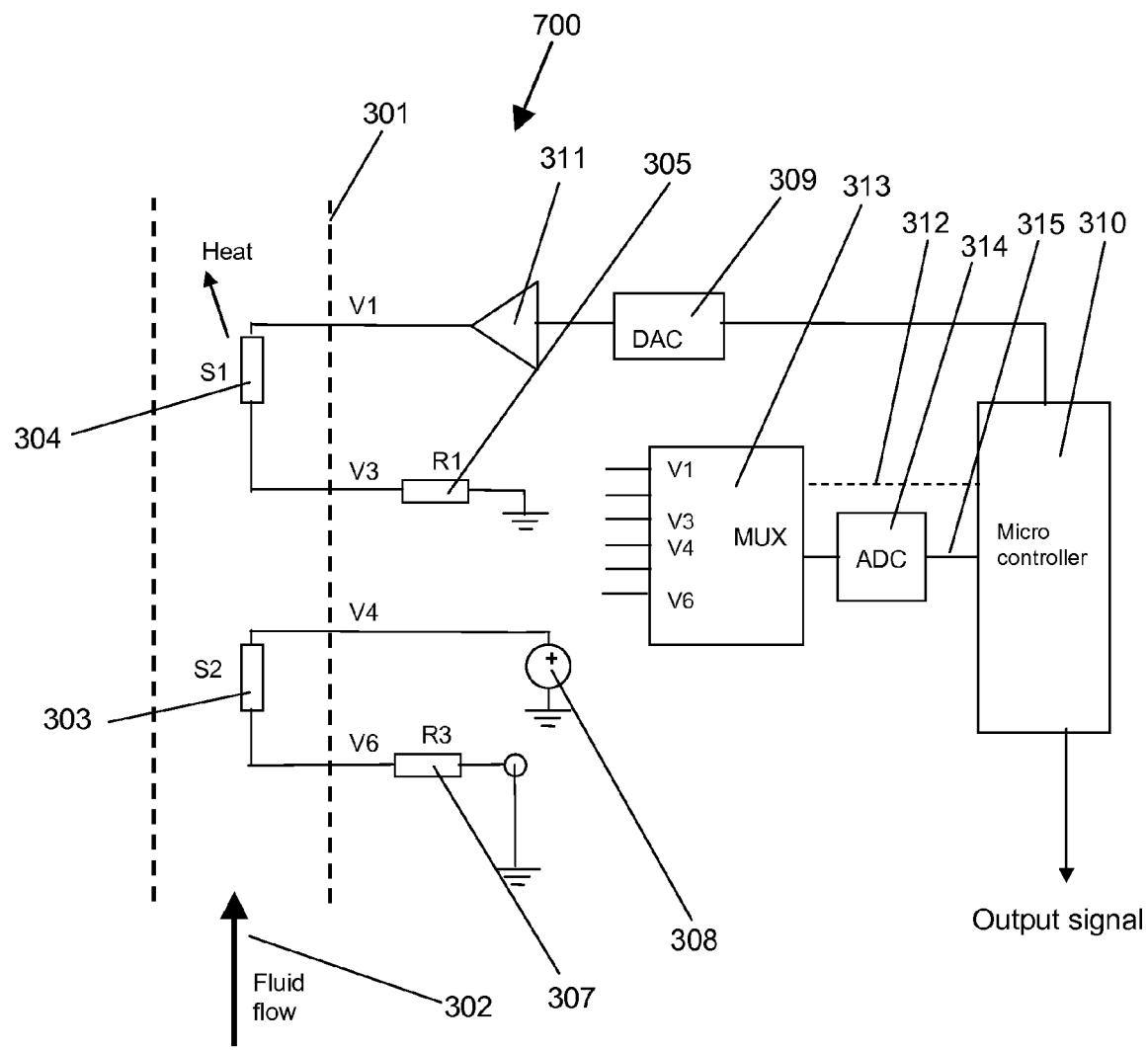
FIG. 7 is a block diagram of a system without some components of the system of FIG. 3 in one embodiment of the invention.

FIG. 7 illustrates a measurement system 700 in one embodiment of the invention. System 700 is similar to system 300 but optional components have been removed. In system 700, resistor 307 has been retained but resistor 306 has been removed. Thus, resistor 307 is used to both limit the current through sensor 303 and measure the current through sensor 303. Alternatively, resistor 306 is retained and resistor 307 is removed. In system 700, the potential lead to sensor 304 used to measure voltage V2 in system 300 has been eliminated so lead wire resistance correction cannot be done. Thus, the resistances of sensors 303 and 304 are determined without lead wire resistance correction. In system 700, switch 316 has been removed and the output terminal of resistor 307 is connected directly to ground. Thus, leakage current associated with sensor 303 cannot be measured. Otherwise the operation of system 700 remains substantially the same as described above.

Figure 8:
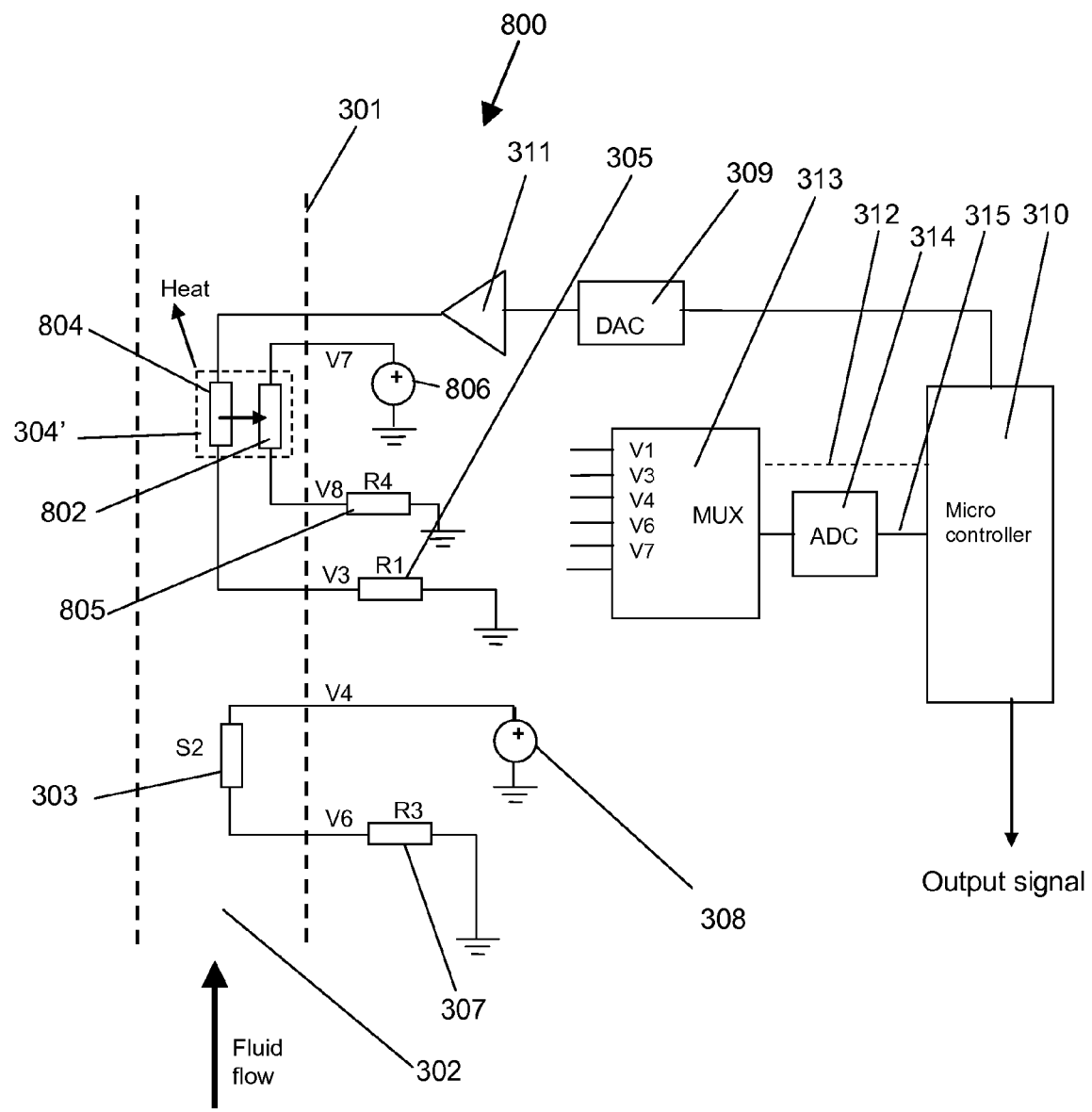
FIG. 8 is a block diagram of a system where the heated sensor includes a sensor and a heater that heats the sensor in one embodiment of the invention.

FIG. 8 illustrates a measurement system 800 in one embodiment of the invention. System 800 is similar to system 700 but sensor 304 is replaced with a sensor 304'. Sensor 304' includes a temperature sensor 802 and a resistive heater 804 such that sensor 802 and heater 804 are in good thermal contact so that heater 804 heats sensor 802 to above the fluid temperature. In system 800, amplifier 311 supplies the current to resistive heater 804. The output terminal of resistive heater 804 is coupled to the input terminal of resistor 305 and then to ground. A voltage source 806 provides a constant reference voltage to the input terminal of temperature sensor 802. The output terminal of temperature sensor 802 is coupled to resistor 805 and then to ground.

The operation of system 800 remains substantially the same as described above. In the operation of this system, when the current is used to determine the fluid properties, the current through heater 804 is used since this current is determined by the fluid properties and heat loss characteristics. The current through temperature sensor 802 is only used to measure the resistance of sensor 802 and therefore its temperature. For this reason, only voltage V3 needs to be measured in the heater loop to determine the current flow through the heater loop. The current through heater 804 is determined from the voltage drop across resistor 305 (i.e., V3) and the known resistance of resistor 305. The current through sensor 802 is determined from the voltage drop across resistor 805 (i.e., V8) and the known resistance of resistor 805 (i.e., R4), and the resistance of sensor 802 is determined from the voltage drop across sensor 802 (i.e., V7-V8) and the current through sensor 802 as described above. As for system 800, no potential lead line is included to measure and correct for lead resistance. If such a potential lead is to be added, it would be best located at the output terminal of heater 804 since the larger current in the heater circuit would allow a more accurate measurement of lead resistance.

Advantages

Figure 1:
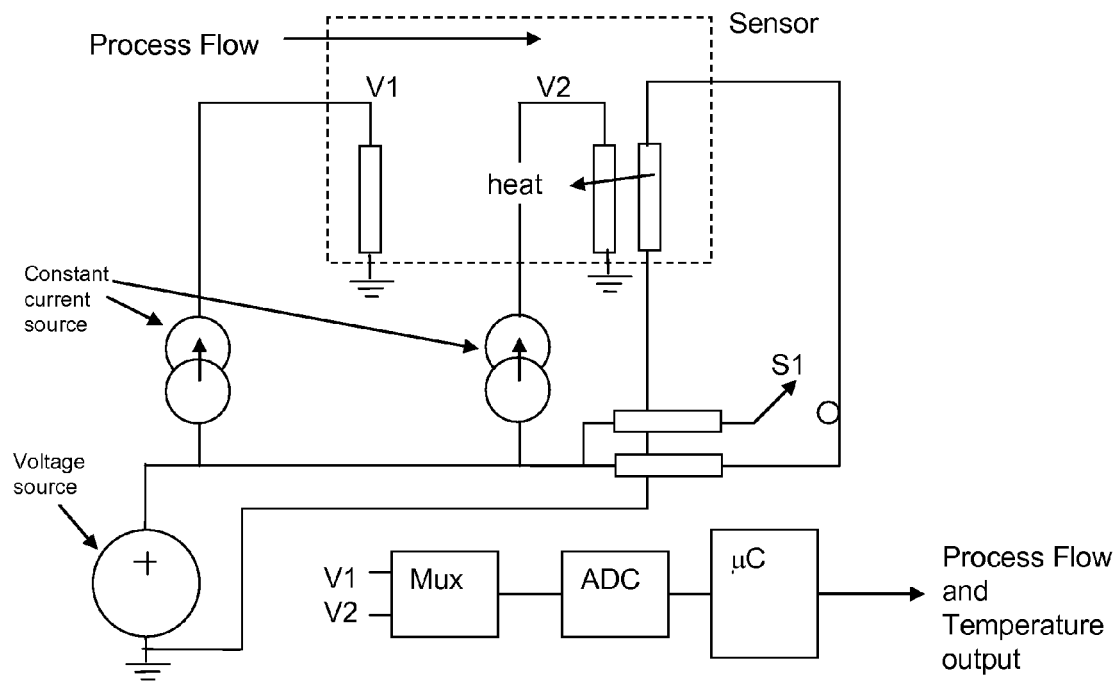
FIG. 1 is a block diagram of a conventional constant power anemometer.
Figure 2:
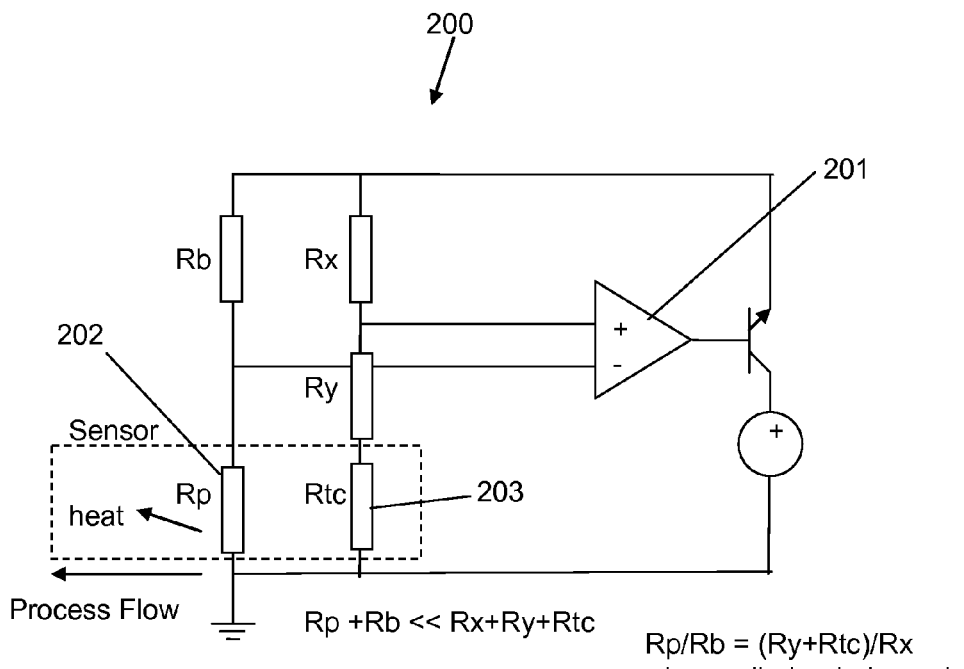
FIG. 2 is a block diagram of a conventional constant temperature anemometer (provided resistor 203 is a fixed resistor not in the fluid stream) or a proportional temperature difference anemometer.

The prior art anemometers described require different analog circuit designs. However, system 300 and its method of measurement used herein could operate in any of these modes as described above. A major advantage of system 300 is that a wide range of sensor types and resistance values can be selected. For example in the Wheatstone Bridge approach of FIG. 2, the fluid temperature sensor will self heat if it does not have a high resistance. In system 300, any resistance value can be selected as long as the circuit and ADC 314 have sufficient sensitivity to measure the resistance and therefore the temperature of sensor 303 at the required level of accuracy.

There are other advantages for system 300 and its measurement methods. None of the components in system 300 are required to be of very high precision or accuracy. For example, ADC 314 takes an input voltage and converts it to a digital output voltage that represents the voltage value. A high precision ADC would have a fixed conversion factor from unit to unit and this conversion factor supplied by the manufacturer of the ADC would be entered into the microcontroller to convert the digital value from a voltage measurement to a voltage value for the calculations of current, resistance, and temperature. However, such a high precision ADC would be very expensive. A lower cost ADC can vary widely in zero and span from component to component (ADC to ADC) so that using a fixed conversion factor or a fixed conversion curve from digital value to voltage for all such components would include a large error band. For this reason, a given input voltage applied to one of these ADCs would give a digital value that when converted to a voltage by the microcontroller would have a large error. An alternative approach is to calibrate the ADC 314 during the circuit assembly process by applying one or more voltages across the range of interest to the ADC and reading the output digital values to generate a calibration function or calibration curve. The constants of the calibration function or calibration curve can be then recorded for storage in the microcomputer 310 for that particular circuit.

Similarly, resistors 305, 306, and 307 need not meet high performance specification but only need to be calibrated via resistance measurements or voltage versus current measurements. DAC may not need calibration but could also be calibrated by varying the input digital signal and measuring the voltage output. All of these calibration values can then be stored as calibration data. Such calibration of electrical voltage response and resistance can be done rapidly and at low cost using automated equipment during circuit assembly and the values stored as calibration factors (either as a table or as a mathematical function) in microcontroller 310. Sensor 303 must be similar calibrated over a temperature range. Sensor 304 would require calibration under flow conditions over a range of power levels and over a range of fluid temperatures since the heat loss characteristics are important to the sensor operation as thermal anemometer. The ability to use components with reduced specifications (accuracy) can reduce the cost of the electronics. This is traded for increased level of calibration of the components which can be cost effective if done with automated equipment during the manufacturing process.

Another advantage is that the circuit and the sensors need not be matched or calibrated together as is required for analog circuit anemometer designs. Once the circuit characteristics are known and available as calibration data and the sensor characteristics are similarly measured and available as calibration data, any circuit can be coupled with any sensor and high accuracy fluid velocity measurements obtained by loading the appropriate calibration data into the micro computer.

Field servicing is also simplified and enhanced. Circuit failure would require only changing the circuit and loading the circuit parameters for the new circuit and sensor calibration parameters for the existing sensors into the micro computer. Similarly a failed sensor 304 or 303 would require only changing the sensor and inputting new calibration parameters for the sensor into microcontroller 310

Various other adaptations and combinations of features of the embodiments disclosed are within the scope of the invention. Numerous embodiments are encompassed by the following claims.

What is claimed is:

1. A flow switch that measures a flow velocity of a fluid flowing through a conduit, comprising:
   a first sensor in the conduit and immersed in the fluid, wherein:
      the first sensor has a first resistance that changes with temperature;
      the first sensor is heated by one of (1) a first current flowing through the first sensor and (2) the first current flowing through a heating element thermally coupled to the first sensor, the first sensor exchanging heat with the fluid;
   a second sensor in the conduit and immersed in the fluid, wherein:
      the second sensor has a second resistance that changes with temperature; and
      the second sensor is substantially at the temperature of the fluid; and
   a microcontroller containing firmware, wherein:
      the microcontroller calculates the first current;
      the microcontroller calculates the first and the second resistances;
      the microcontroller provides a control signal that sets the first current based on at least one of the first current, the first resistance, and the second resistance; and
      the microcontroller calculating the flow velocity based on at least one of the first current, the first resistance, and the second resistance; and
      the microcontroller provides an output signal related to the flow velocity.

2. The flow switch of claim 1, further comprising:
   a first resistor of a first known resistance coupled in series with the first sensor;
   a second resistor of a second known resistance coupled in series with the second sensor,
   a multiplexer coupled to sample voltages (1) along a first serial path including the first sensor and the first resistor, and (2) along a second serial path including the second sensor and the second resistor;
   an analog-to-digital converter converting the voltages to digital voltage values and providing the digital voltage values to the microcontroller;
   a digital-to-analog converter receiving the control signal from the microcontroller;
   an amplifier receiving an input voltage from the digital-to-analog converter and providing an output voltage to one of the first sensor and the heating element; and
   wherein at least two of (1) the microcontroller, (2) the multiplexer, (3) the analog-to-digital converter, (4) the digital-to-analog converter, and (5) the amplifier are part of an integrated chip.

3. The flow switch of claim 1, wherein the first and the second sensors are resistance temperature detectors (RTDs) that have metal films deposited on ceramic forms.

4. The flow switch of claim 3, wherein the metal films are platinum.

5. A method for operating a flow switch comprising a microprocessor, a first sensor, and a second sensor, the first and the second sensors being in a conduit through which a fluid is flowing, the method comprising the microprocessor:
   calculating a first current flowing through the first sensor;
   calculating a first resistance of the first sensor;
   calculating a second resistance of the second sensor;
   setting the first current based on at least one of the first current, the first resistance, and the second resistance;
   calculating a flow velocity of the fluid based on at least one of the first current, the first resistance, and the second resistance; and
   providing an output signal related to the flow velocity.

6. The method of claim 5, wherein:
   the flow switch further comprises a first resistor, a second resistor, a multiplexer, an analog-to-digital converter, a digital-to-analog converter, and an amplifier;
   said calculating the first resistance comprises:
      measuring a first voltage drop across the first resistor, the first resistor being coupled in series with the first sensor;
      calculating the first current from the first voltage drop and a first known resistance of the first resistor;
      measuring a second voltage drop across the first sensor; and
      calculating the first resistance from the second voltage drop and the first current;
   said calculating the second resistance comprises:
      measuring a third voltage drop across the second resistor, the second resistor being coupled in series with the second sensor;
      calculating a second current flowing through the second sensor from the third voltage drop and a second known resistance of the second resistor;
      measuring a fourth voltage drop across the second sensor; and
      calculating the second resistance from the fourth voltage drop and the second current;
   said measuring first, second, third, and fourth voltage drops comprises:
      using a multiplexer to sample voltages at locations along a first serial path including the first sensor and the first resistor, and a second serial path including the second sensor and the second resistor; and
      using an analog-to-digital converter to convert the voltages to digital voltage values;

said setting the first current comprises using a digital-to-analog converter and an amplifier to provide an input voltage to the first sensor; and at least two of (1) the microcontroller, (2) the multiplexer, (3) the analog-to-digital converter, (4) the digital-to-analog converter, and (5) the amplifier are part of an integrated chip.

7. The method of claim 5, wherein the first and the second sensors are resistance temperature detectors (RTDs) that have metal films deposited on ceramic forms.

8. The method of claim 7, wherein the metal films are platinum.

* * * * *